US012699908B2

(12) United States Patent
Luo et al.

(10) Patent No.: US 12,699,908 B2
(45) Date of Patent: Aug. 4, 2026

(54) KNOWLEDGE MANAGEMENT SYSTEM AND KNOWLEDGE MANAGEMENT METHOD

(71) Applicants: DIGIWIN CO., LTD., Shanghai (CN); DATA SYSTEMS CO., LTD., New Taipei City (TW)

(72) Inventors: Qun Luo, Shanghai (CN); Xiaoliang Ma, Shanghai (CN); Guoxin Sun, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 593 days.

(21) Appl. No.: 18/297,655

(22) Filed: Apr. 10, 2023

(65) Prior Publication Data

US 2024/0265279 A1 Aug. 8, 2024

(30) Foreign Application Priority Data

Feb. 7, 2023 (CN) .......................... 202310096900.X

(51) Int. Cl.
*G06N 5/04* (2023.01)
*G06N 5/02* (2023.01)
*G06N 7/01* (2023.01)

(52) U.S. Cl.
CPC ................. *G06N 5/04* (2013.01); *G06N 5/02* (2013.01)

(58) Field of Classification Search
CPC .. G06N 5/04; G06N 5/02; G06N 7/00; G06N 7/01; G06N 7/02

USPC ..... 706/15, 16, 18, 25, 6, 31, 10, 14, 45, 46
See application file for complete search history.

(56) References Cited

U.S. PATENT DOCUMENTS

| | | | |
|---|---|---|---|
| 11,481,553 B1 * | 10/2022 | Durvasula | G06F 40/279 |
| 2019/0132229 A1 * | 5/2019 | McCormack | H04W 12/12 |
| 2024/0264897 A1 * | 8/2024 | Madiya | G06N 3/08 |

FOREIGN PATENT DOCUMENTS

| | | | | |
|---|---|---|---|---|
| WO | WO-03056477 A1 * | 7/2003 | | G06Q 10/06 |
| WO | WO-2018187712 A1 * | 10/2018 | | G06N 3/045 |

* cited by examiner

*Primary Examiner* — Daquan Zhao
(74) *Attorney, Agent, or Firm* — JCIPRNET

(57) ABSTRACT

A knowledge management system and a knowledge management method are disclosed. The knowledge management system includes an electronic device and a server. The electronic device obtains target input data and application input data. The server includes a data model, an inspection item model, an execution model, and a control and decision model. The data model generates multiple activity data nodes according to the target input data and source data. The inspection item model calculates the activity data nodes according to standard data to generate an inspection result. The execution model executes a package operation according to the inspection result to generate a solution task. The control and decision model calculates the application input data based on the solution task to generate a feedback result to the electronic device. Therefore, the knowledge management system may automatically create an executable task to improve working efficiency.

14 Claims, 7 Drawing Sheets

KNOWLEDGE MANAGEMENT SYSTEM AND KNOWLEDGE MANAGEMENT METHOD

CROSS-REFERENCE TO RELATED APPLICATION

This application claims the priority benefit of China application serial no. 202310096900. X, filed on Feb. 7, 2023. The entirety of the above-mentioned patent application is hereby incorporated by reference herein and made a part of this specification.

BACKGROUND

Technical Field

The disclosure relates to a management system, and more particularly, to a knowledge management system and a knowledge management method applying data-driven programming.

Description of Related Art

A system applying data-driven programming may create executable tasks from data expressed as conditions and operations. The task in execution may be abnormal in a process of the task due to variable factors of a peripheral environment. In general, the system may build an enterprise knowledge base to propose solutions to the above abnormal processes. The current system may provide a large number of candidate solutions based on the enterprise knowledge base, using modules such as semantic search, question answering, and recommendation. However, the candidate solutions are still required to be manually determined to obtain a solution that meets actual requirements, which reduces working efficiency.

SUMMARY

The disclosure relates to a knowledge management system, which may automatically create an executable task by applying data-driven programming and a knowledge graph, so as to improve working efficiency.

According to an embodiment of the disclosure, a knowledge management system in the disclosure includes an electronic device and a server. The electronic device is configured to execute an interface module to obtain target input data and application input data. The server is coupled to the electronic device. The server includes a data model, an inspection item, an execution model, and a control and decision model. The data model is configured to generate multiple activity data nodes according to the target input data and source data. The inspection item model is configured to calculate the activity data nodes according to standard data to generate at least one inspection result. The execution model is configured to execute a package operation according to the at least one inspection result to generate a solution task. The control and decision model is configured to calculate the application input data based on the solution task to generate a feedback result to the electronic device.

According to an embodiment of the disclosure, a knowledge management method in the disclosure includes the following. Through an electronic device, an interface module is executed to obtain target input data and application input data. Through a data model of a server, multiple activity data nodes are generated according to the target input data and source data. Through an inspection item model of the server, the activity data nodes are calculated according to standard data to generate at least one inspection result. Through an execution model of the server, a package operation is executed according to the at least one inspection result to generate a solution task. Through a control and decision model of the server, the application input data is calculated based on the solution task to generate a feedback result to the electronic device.

Based on the above, the knowledge management system and the knowledge management method in the disclosure may collect a large amount of data (i.e., the target input data, the source data, and the standard data) to construct a graph knowledge base represented as multiple nodes, and may automatically generate the solution task according to the above data and nodes. Therefore, the knowledge management system may execute the solution task for the current application input data in response to various variable factors. In this way, the knowledge management system may pass on knowledge and experience, and improve the working efficiency.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
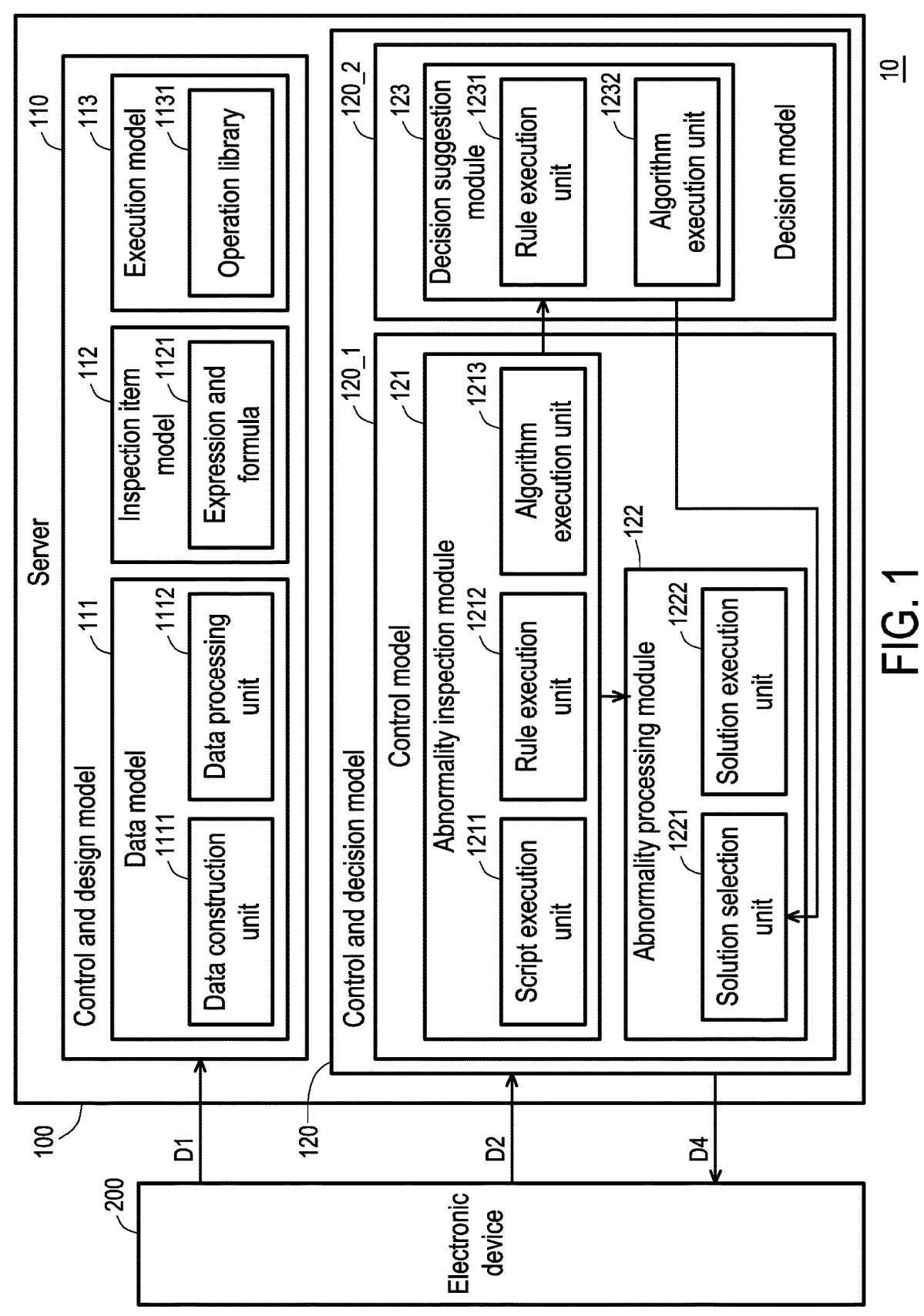
FIG. 1 is a circuit block diagram of a knowledge management system according to an embodiment of the disclosure.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

FIG. 1 is a circuit block diagram of a knowledge management system according to an embodiment of the disclosure. Referring to FIG. 1, a knowledge management system 10 applies data-driven programming and a knowledge graph. The knowledge management system 10 is configured to automatically maintain a knowledge base, and to automatically propose and execute a task that may solve an abnormal process. In this embodiment, the knowledge management system 10 may include a server 100 and an electronic device 200. The electronic device 200 is coupled to the server 100. A user may operate the electronic device 200 and access the server 100 through the electronic device 200. The electronic device 200 may be, for example, a mobile phone, a tablet computer, a notebook computer, a desktop computer, and the like.

In this embodiment, the server 100 may include a control and design model 110, a control and decision model 120, a memory (not shown), and a processor (not shown). The memory may store the control and design model 110, the control and decision model 120, and various models and related algorithms thereof mentioned in the embodiments of the disclosure, and may further store computing software, etc. such as related algorithms, programs, and data used to achieve automatic generation and execution of functions of a program task in the disclosure. The memory may be, for example, a dynamic random access memory (DRAM), a flash memory, or a non-volatile random access memory (NVRAM). However, the disclosure is not limited thereto.

In this embodiment, the processor is coupled to the control and design model 110, the control and decision model 120, and the memory. The processor may access data in the memory and various models, as well as data transmitted between the electronic device 200. The processor may be, for example, a signal converter, a field programmable gate array (FPGA), a central processing unit (CPU), other programmable general-purpose or special-purpose microprocessors, a digital signal processor (DSP), a programmable controller, an application specific integrated circuit (ASIC), a programmable logic device (PLD), other similar devices, or a combination of these devices, which may load and execute computer program-related firmware or software to achieve functions such as data collection, calculation, data structuration, packaging, and execution.

In this embodiment, the control and design model 110 is operable at design time, and is configured to generate and provide a solution task D3 that may solve abnormality according to target input data D1. The control and design model 110 may include a data model 111, an inspection item model 112, and an execution model 113.

In this embodiment, the control and decision model 120 is operable in an actual application stage, and is configured to execute a task (e.g., the solution task D3) according to application input data D2 and provide a result (e.g., a feedback result D4) after task execution. The control and decision model 120 may include a control model 1201 and a decision model 1202. The control model 1201 may include an abnormality inspection module 121 and an abnormality processing module 122. The decision model 1202 may include a decision suggestion module 123.

Figure 2:
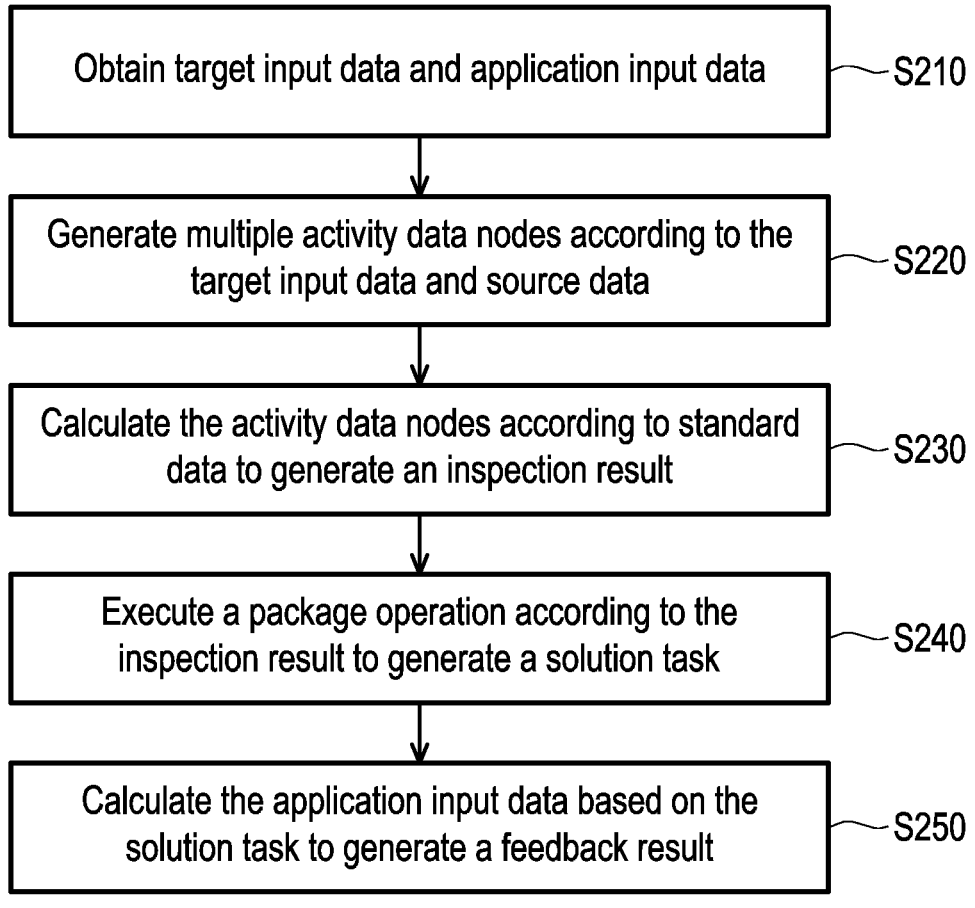
FIG. 2 is a flowchart of a knowledge management method according to an embodiment of the disclosure.

FIG. 2 is a flowchart of a knowledge management method according to an embodiment of the disclosure. Referring to FIGS. 1 and. 2, the knowledge management system 10 may execute steps S210 to S250. An order of steps S210 to S250 is merely an example for description, and the disclosure not limited thereto. In this embodiment, steps S210 to S250 may be applied to the following exemplary situations.

In this embodiment, the user operates the electronic device 200 to execute an interface module (not shown) stored in the electronic device 200. The electronic device 200 accesses the server 100 through the interface module. The interface module may be, for example, an application programming interface (API). In some embodiments, the electronic device 200 executes an enterprise system to cooperate with the server 100 through the interface module. The enterprise system may be, for example, an enterprise resource planning (ERP) system.

In step S210, the electronic device 200 executes the interface module to obtain the target input data D1 and the application input data D2. Specifically, during the design time, the user operates the electronic device 200 to input information, so that the electronic device 200 obtains the target input data D1 through the interface module. The target input data D1 may be, for example, a matter to be solved and/or controlled by the user (or an enterprise).

In the actual application stage, the user operates the electronic device 200 to generate the application input data D2, or the electronic device 200 executes the enterprise system to generate the application input data D2, so that the electronic device 200 obtains the application input data D2 through the interface module. The application input data D2 may be, for example, routine data generated during the execution of the enterprise system, such as a purchase order or a purchase requisition.

In step S220, the processor accesses the target input data D1, and executes the data model 111, so that the data model 111 generates multiple activity data nodes according to the target input data D1 and source data. The source data may be, for example, reference data associated with the target input data D1. The activity data nodes may for example, be data structured and processed knowledge graph data.

In detail, the data model 111 performs the data structuration on the target input data D1 and the source data respectively through a data construction unit 1111, so as to establish the knowledge graph data. The data model 111 performs data processing on the knowledge graph data through a data processing unit 1112 to generate the activity data nodes. The data processing may include calculations without conditional expressions such as mathematical calculations, sampling, or a combination of the foregoing.

In step S230, the processor executes the inspection item model 112, so that the inspection item model 112 calculates the activity data nodes according to standard data to generate one or more inspection results. The standard data may be, for example, reference data such as an expression and formula 1121. For example, the standard data is the abstracted reference data from a standard knowledge base, or the reference data that has been semantically analyzed and defined. The inspection result may be, for example, a data-structured determination result, represented by nodes.

In detail, the inspection item model 112 accesses the standard data (such as the expression and formula 1121) in the memory. The inspection item model 112 calculates the activity data nodes with reference to the expression and formula 1121, and generates the inspection results corresponding to the above nodes. That is, the inspection item model 112 may perform conditional calculation on the activity data nodes.

In step S240, the processor executes the execution model 113, so that the execution model 113 executes a package operation according to the inspection result to generate the solution task D3. In detail, the execution model 113 accesses an operation library 1131 in the memory. The execution model 113 translates the inspection result into an executable data structure (i.e. the solution task D3) based on the operation library 1131.

It should be noted that the solution task D3 complies with the data-driven programming and has already been compiled. The solution task D3 may include data representing information and instructions for calculating (or processing) the above data. In addition, the solution task D3 is associated with the target input data D1 to define a standard process for matters that the user wants to solve and/or control.

In step S250, the processor accesses the solution task D3 and the application input data D2, and executes the control and decision model 120, so that the control and decision model 120 calculates the application input data D2 based on the solution task D3 to generate the feedback result D4 to the electronic device 200. The feedback result D4 may be, for example, a result of executing the established standard process (e.g. the solution task D3) with reference to a current situation (e.g. the application input data D2). For example, it is assumed that the standard process includes sending an email to a supervisor through the processor when an event occurs abnormally. At this time, the control and decision model 120 is executed to send an email as the feedback result D4 to the electronic device 200 operated by the supervisor.

In detail, the abnormality inspection module 121 checks whether the event indicated by the application input data D2 is abnormal through a script execution unit 1211, a rule execution unit 1212, and an algorithm execution unit 1213, and will trigger the abnormal process. When the above inspection result is normal, the abnormality processing module 122 and the decision suggestion module 123 are not triggered. Conversely, when the above inspection result is abnormal, the abnormality processing module 122 and the decision suggestion module 123 are triggered. At this time, the decision suggestion module 123 generates one or more tasks that may solve the abnormal process through a rule execution unit 1231 and an algorithm execution unit 1232 according to the application input data D2. The abnormality processing module 122 selects the task (e.g. the solution task D3) through a solution selection unit 1221. The abnormality processing module 122 executes the selected task through a solution execution unit 1222, and generates a result after execution (e.g., the feedback result D4) to be fed back to the electronic device 200.

It is worth mentioning here that a large amount of data (e.g., the target input data D1, the source data, and the standard data) is collected through the data model 111 and the inspection item model 112 to automatically construct the knowledge graph data (such as the activity data nodes), which may be precipitated and packaged in a knowledge graph model to implement inheritance of knowledge and experience. On the other hand, through the execution model 113 to automatically generate the solution task D3 according to the knowledge graph data, the user do not need to fully understand the connotation of knowledge, and may ensure that the enterprise may execute business processes according to management experience and methods, thereby improving working efficiency.

Figure 3:
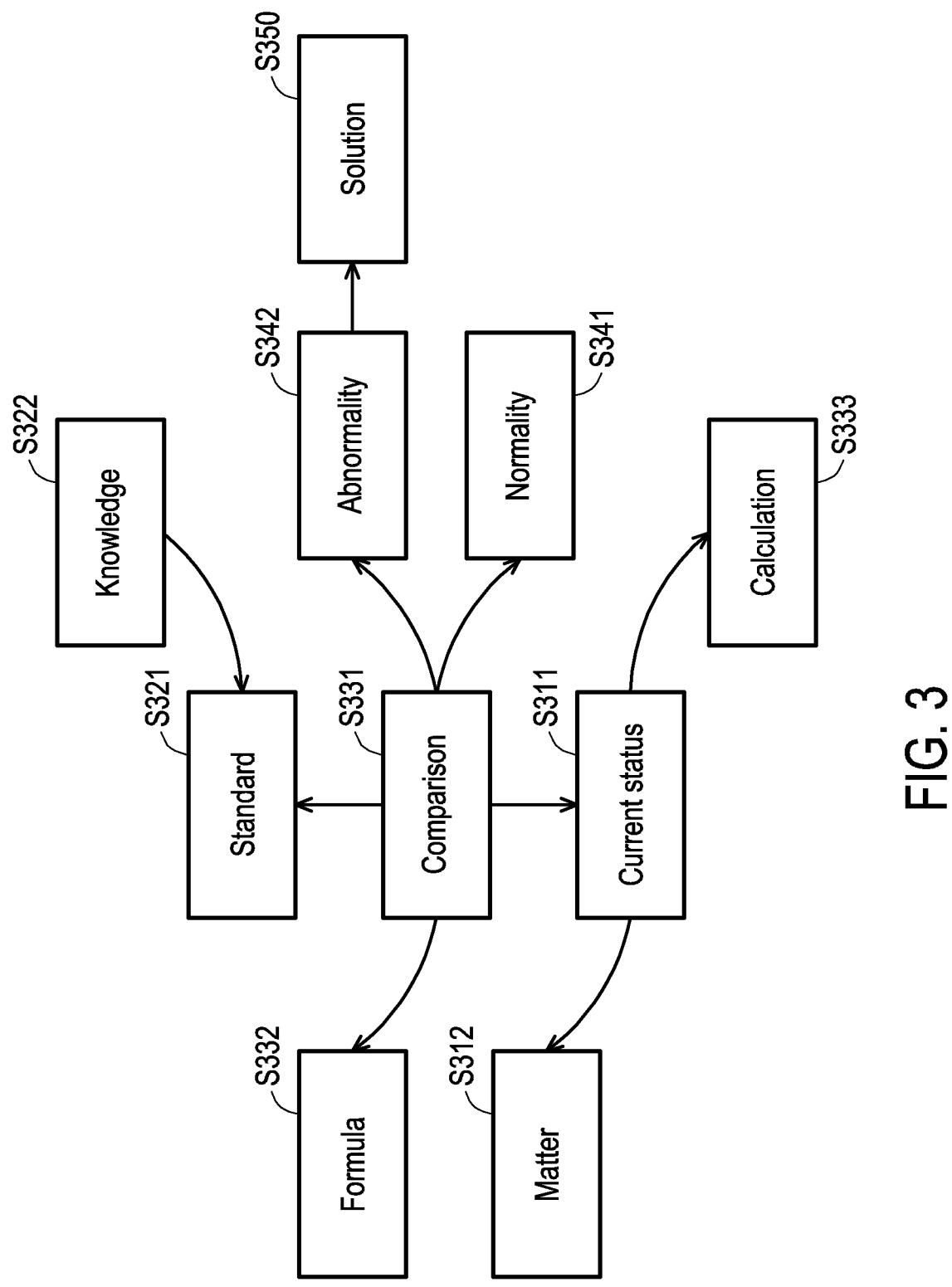
FIG. 3 is a schematic diagram of an operation of a knowledge management system according to an embodiment of the disclosure.

FIG. 3 is a schematic diagram of an operation of a knowledge management system according to an embodiment of the disclosure. Referring to FIGS. 1 and 3, the knowledge management system 10 may execute multiple modules S311 to S350 to illustrate how the control and design model 110 implements model management, identification, and control of abnormality through knowledge graph technology. In this embodiment, the design time and the actual application stage may be executed continuously. Therefore, the knowledge management system 10 may take the matter to be solved and/or to be controlled as the current matter in the actual application. That is, the target input data D1 may replace the application input data D2 to be regarded as the actual routine data.

In the modules S311 to S312, the data model 111 accesses the matter (e.g., the target input data D1) and a current status (e.g., the source data) to identify an issue that is required to be solved. In the modules S321 to S322, the inspection item model 112 accesses standards (e.g., the standard data) in the knowledge base to obtain the standard data about the issue. In the modules S331 to S333, the inspection item model 112 uses formulas (e.g., the expression and formula 1121) in the knowledge base, calculates the known standards and the current status, and compares calculation results of the above two, so as to compare the standards with the situation requiring control.

When the inspection item model 112 detects that the current status conforms to the standard and is normal, the execution model 113 executes the module S341. Conversely, when the inspection item model 112 detects that the current status does not conform to the standard and is abnormal, the execution model 113 executes the module S342. In the module S341, when the current status is normal, the execution model 113 is disabled and the package operation will not be executed. In the module S342, when the current status is abnormal, the execution model 113 is enabled to execute the package operation according to a comparison result (e.g., the inspection result) to generate a solution (e.g., the solution task D3). In the module S350, the control and decision model 120 processes the current matters in the modules S311 to S312 based on the solution (e.g., the solution task D3), so as to implement the solution through the comparison result in the module S331.

For example, in an example where field equipment schedule management is applied, an objective of the enterprise system is to control an abnormal task. The abnormal task may be, for example, any equipment or material whose processing time exceeds a standard working hour range. A method for controlling the abnormal task may be, for example, to send the email to the supervisor.

Specifically, the matter of the module S312 may be, for example, an abnormality processing task, that is, related data (e.g., a purchase requisition for the first equipment) for processing the certain equipment. The current status of module S311 may be, for example, the current time and start time of processing the purchase requisition. The knowledge of the module S322 may be, for example, abnormality standard basic data in the knowledge base. The standard of the module S321 may be, for example, standard abnormal time in the abnormality standard basic data. The formula of the module S332 may be, for example, "a+b>c", where a, b, and c may be indicated as the start time, the standard abnormal time, and the current time, respectively. That is, a case where a processing flow of the purchase requisition is defined as abnormal means that a sum of the start time and the standard abnormal time of the purchase requisition during processing is greater than the current time of the purchase requisition during processing.

Continuing the above description, the calculation of the module S333 may be, for example, the mathematical calculation. That is, the calculation includes referring to the formula of the module S332, substituting the start time into a parameter a, substituting the standard abnormal time into a parameter b, and calculating a sum of the parameter a and the parameter b. The comparison of the module S331 may be, for example, calculation and determination with the conditional expressions. That is to say, the comparison includes referring to the formula of the module S332 to compare whether the sum of the module S333 is greater than the current time (i.e., a parameter c). When the sum of the parameter a and the parameter b is greater than the parameter c, it means that a processing period of the purchase requisition has exceeded the standard working hour range. At this time, the abnormality of the module S342 may be, for example, that the processing period of the purchase requisition has expired. The solution of the module S350 may be, for example, to send the email to the supervisor.

Figure 4:
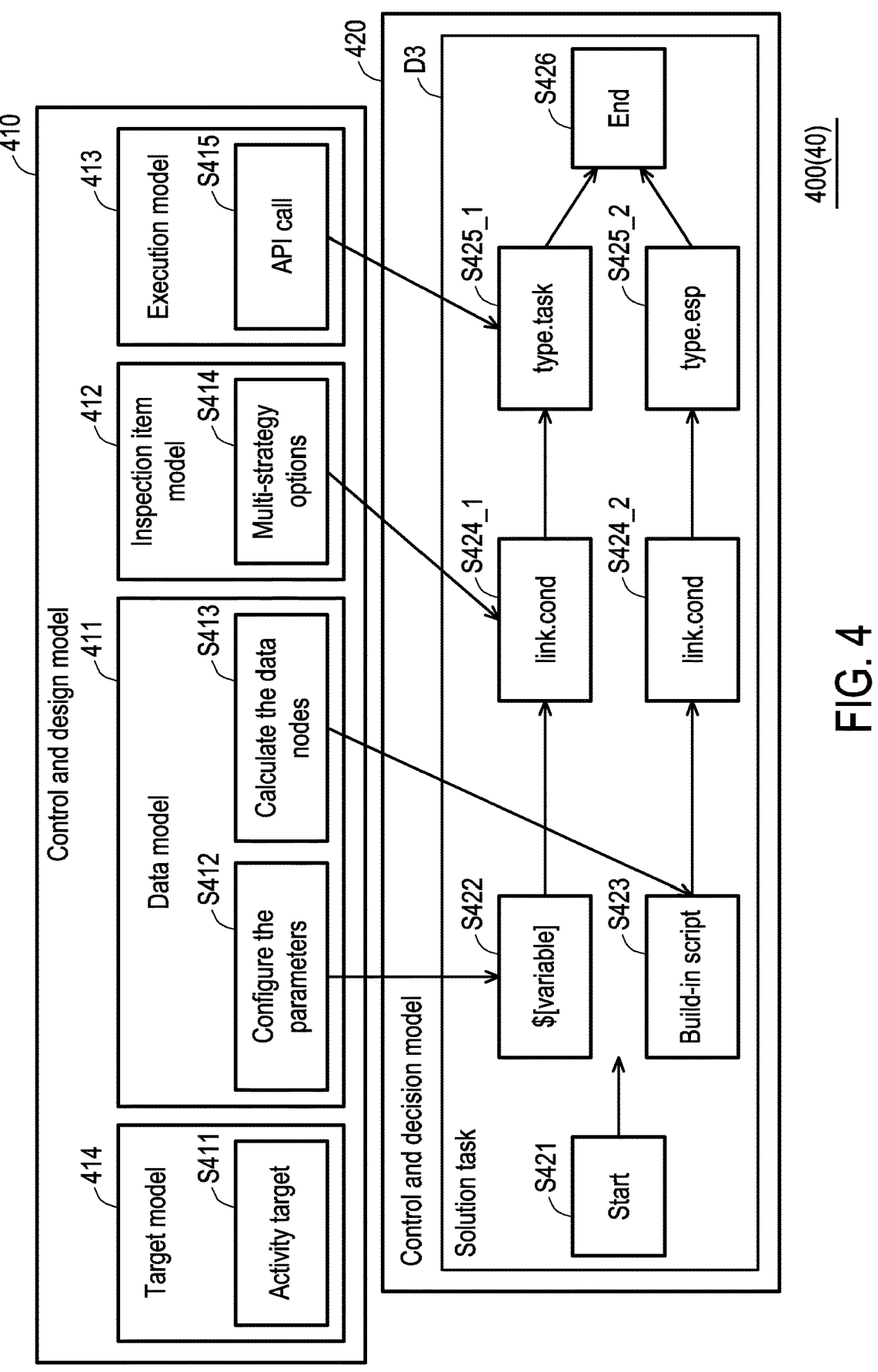
FIG. 4 is a schematic diagram of an operation of a knowledge management system according to another embodiment of the disclosure.

FIG. 4 is a schematic diagram of an operation of a knowledge management system according to another embodiment of the disclosure. Referring to FIG. 4, a knowledge management system 40 may include a server 400. The server 400 may include a control and design model 410 and a control and decision model 420. In the embodiment of FIG. 4, the control and design model 410 may include a target model 414, a data model 411, an inspection item model 412, and an execution model 413. The control and decision model 420 may access and execute the solution task D3. The data model 411, the inspection item model 412, the execution model 413, and the control and decision model 420 may refer to relevant descriptions of the knowledge management system 10 and be derived by analog. Therefore, the same details will not be repeated in the following.

Figure 5:
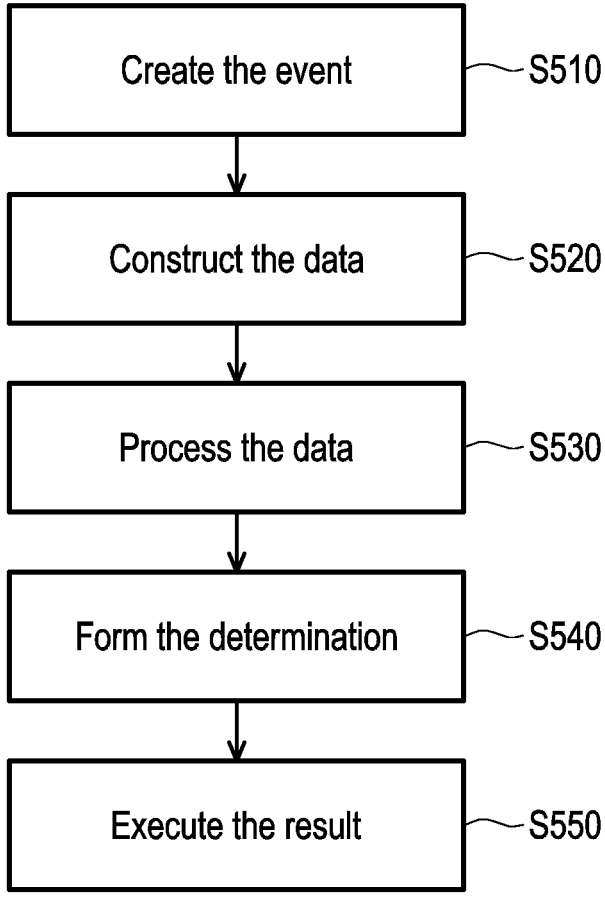
FIG. 5 is a flowchart of a knowledge management method according to another embodiment of the disclosure.

Referring to FIG. 5 together, FIG. 5 is a flowchart of a knowledge management method according to another embodiment of the disclosure. The knowledge management system 40 may execute steps S510 to S550 and multiple modules S411 to S426. An order of steps S510 to S550 is merely an example for description, and the disclosure not limited thereto. In this embodiment, steps S510 to S550 may be applied to the following exemplary situations.

In this embodiment, the server 400 accesses the electronic device through the interface module. The control and design model 410 obtains the event (e.g., the matter of the module S312 in FIG. 3) from the electronic device through the interface module. The control and design model 410 generates the executable solution task D3 according to the above event, so that the control and decision model 420 executes the solution task D3 according to the above event.

Specifically, in step S510, the target model 414 creates the event. In this embodiment, the target model 414 defaults the event or the task (e.g., the matter of the module S312 in FIG. 3) in the execution of the electronic device as a newly created data-driven event, and introduces a changed data state corresponding to this event to a newly created data state.

In detail, the target model 414 executes the module S411 to control a mount point of an activity target. The activity target may be a data source provided by electronic device to provide supply of raw data. The activity target may be, for example, the matter of the module S312 in FIG. 3, and may include the target input data D1 and/or the application input data D2 provided by the electronic device. The mount point controlled by the target model 414 may be the tasks or project, and may be, for example, the task or project based on the data-driven programming.

In step S520, the data model 411 constructs the data (e.g., the knowledge graph data) according to the event. In this embodiment, the data model 411 constructs the data (e.g., the matter of the module S312 and the current status of the module S311 in FIG. 3) related to the event into preliminary activity nodes. Therefore, the data model 411 may structure the event to combine various processes in the event.

In detail, the data model 411 executes the module S412 to configure an event parameter. Taking the embodiment of FIG. 3 as an example, in the module S412, the data model 411 configures multiple parameters respectively for the matter (i.e., the target input data D1 in the embodiment of FIG. 1) of the module S312 and the current status (i.e., the source data in the embodiment of FIG. 1) of the module S311. The data model 411 configures the parameters to create multiple preliminary activity data nodes. That is, the data model 411 may deconstruct the parameters in the event and a coupling relationship between the parameters, and express a result of the above deconstruction as multiple data nodes.

It should be noted that, in addition to extracting the data provided by the electronic device (i.e., the matter and the current status), the data model 411 may also obtain an external resource as the reference data through the interface module. Therefore, the data model 411 may provide a modeled integration method to extract and process a large amount of data to provide a valuable determination basis.

In step S530, the data model 411 processes the structured data. In this embodiment, the data model 411 processes result data (e.g., the calculation result of the module S333 in FIG. 3 represented by the script) that is required to satisfy programming through a built-in data processing tool (e.g., the formula of the module S322 in FIG. 3).

In detail, the data model 411 executes the module S413. Taking the embodiment of FIG. 3 as an example, in the module S413, the data model 411 calculates the preliminary activity data nodes in the module S412 based on the formula of the module S322, so as to generate the calculation results (i.e., the activity data nodes) of the module S333. That is, the data model 411 processes the data with reference to the formula, and expresses the above calculation result as the data nodes.

In step S540, the inspection item model 412 forms the determination according to the processed data. In this embodiment, the inspection item model 412 forms an inspection item (e.g., the standard data of the module S321 in FIG. 3) into a gateway routing node, and compares the nodes with the nodes processed by the data model 411 to generate the inspection result (e.g., the comparison result of the module S331 in FIG. 3).

In detail, the inspection item model 412 executes the module S414. Taking the embodiment of FIG. 3 as an example, in the module S414, the inspection item model 412 calculates the calculation result (i.e., the activity data nodes) of the module S333 from the data model 411 with reference to multiple multi-strategy options in the standard data of the module S321, so as to create multiple linking data nodes. The inspection item model 412 calculates the linking data nodes to generate a normal inspection result indicated by the module S341 and/or an abnormal inspection result indicated by the module S342. In this embodiment, the multi-strategy options may correspond to one or more inspection results. The multi-strategy options may be, for example, calculation formulas with different conditional expressions.

It should be noted that the inspection item model 412 may accumulate a batch of valuable management knowledge (e.g., the linking data nodes) through the knowledge graph. The inspection item model 412 may correct a process of the event through processed control data (e.g., the multi-strategy options) and the above management knowledge, and express it with the inspection result.

In step S550, the execution model 413 executes the determined result. In this embodiment, the execution model 413 forms an expected control process into an operation execution node to form a solution (e.g., the solution of the module S350 in FIG. 3) to the issue. It should be noted that the execution model 413 intervenes in the inspection result through package to ensure expectations of the process from the enterprise.

In detail, the execution model 413 executes the module S415. Taking the embodiment in FIG. 3 as an example, in the module S415, when the inspection result compared by the inspection item model 412 in the module S331 is abnormal, the execution model 413 creates the operation execution nodes by means of API calls according to target expectation data (e.g., the operation library 1131 in the embodiment of FIG. 1), and packages the operation execution nodes into the solution task D3. The control and decision model 420 executes the solution task D3 to implement the solution of the module S350.

Figure 6:
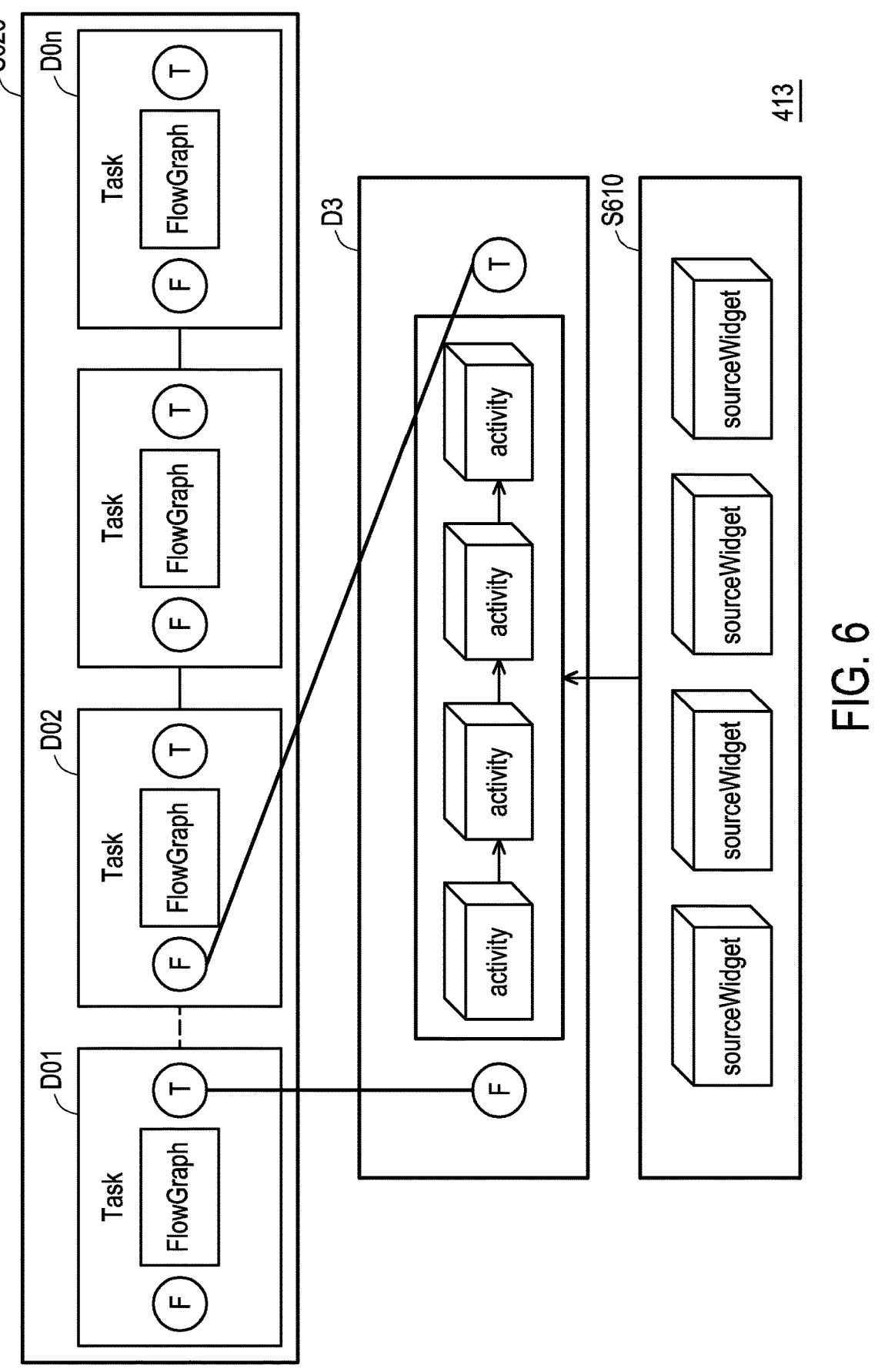
FIG. 6 is a schematic diagram of an operation of an execution model according to the embodiment in FIG. 4 of the disclosure.

Referring to FIG. 6 together, FIG. 6 is a schematic diagram of an operation of an execution model according to the embodiment in FIG. 4 of the disclosure. The execution model 413 may execute multiple modules S610 to S620, and an example is used to illustrate how the execution model 413 is established and packaged into the solution task D3 by means of the API calls.

In the module S610, the execution model 413 obtains one or more software components that may solve the abnormality based on the operation library 1131 shown in the embodiment of FIG. 1. The software components may include blocks shown as "sourceWidget", "activityWidget", "checkWidget", and "planWidget" in FIG. 6 to serve as the operation execution nodes.

In module S620, the execution model 413 accesses the current solution task. The current solution task may include multiple tasks D01 to D0*n*, where n is a positive integer. A data structure of each of the tasks D01 to D0*n* is implemented as the knowledge graph. For example, the task D01 includes first data represented as "F", second data represented as "T", and task data represented as "FlowGraph". The task data is associated with the first data and the second data, and represents a coupling relationship between the above two data. The coupling relationship may include one or more sequential programs, software components, or a combination of the above. The second data represented as "T" in the task D01 may be linked with the first data represented as "F" in the task D02, and the second data represented as "T" in the task D02 may be linked with the first data represented as "F" in the task D03. By analogy, multiple consecutive tasks are formed by sequentially linking.

In this embodiment, the execution model 413 breaks a link between the task D01 and the D02 based on the operation library 1131 shown in the embodiment of FIG. 1, and retrieves the second data represented as "T" in the task D01 and task D02 and the first data represented as "F" in the task D02. The execution model 413 uses the software components in the module S610 as the task data between the retrieved first data and second data to establish and package a new solution task D3. That is, the solution task D3 includes the data represented as "T" in the task D01 as the first data (i.e., "F" in the solution task D3), the data represented as "F" in the task D02 as the second data (i.e., "T" in the solution task D3), and the task data represented as multiple "activity". The task data is associated with the first data and the second data.

Referring again to the embodiment in FIG. 4, the method for the control and decision model 420 to execute the solution task D3 may include multiple operations corresponding to modules S411 to S415. The operation of the control and decision model 420 to access the solution task D3 may correspond to the operation of the module S411 to control the activity target.

The execution of the solution task D3 starts from the module S421 and ends from the module S426. The control and decision model 420 executes the module S422 corresponding to the module S412 to configure the parameters of the event and list the parameters into the preliminary activity data nodes. The control and decision model 420 executes the module S423 corresponding to the module S413 to calculate the preliminary activity data nodes with reference to the formula and build the calculation result into the script (i.e., the activity data nodes). The control and decision model 420 executes the modules S4241 to S4242 corresponding to the module S414 to list the multi-strategy options and check the activity data nodes according to the options to generate the inspection result. The control and decision model 420 executes the modules S4251 to S4252 corresponding to the module S415, so as to make the API call or re-initiate the solution task D3 or other solution tasks according to the inspection result.

Figure 7:
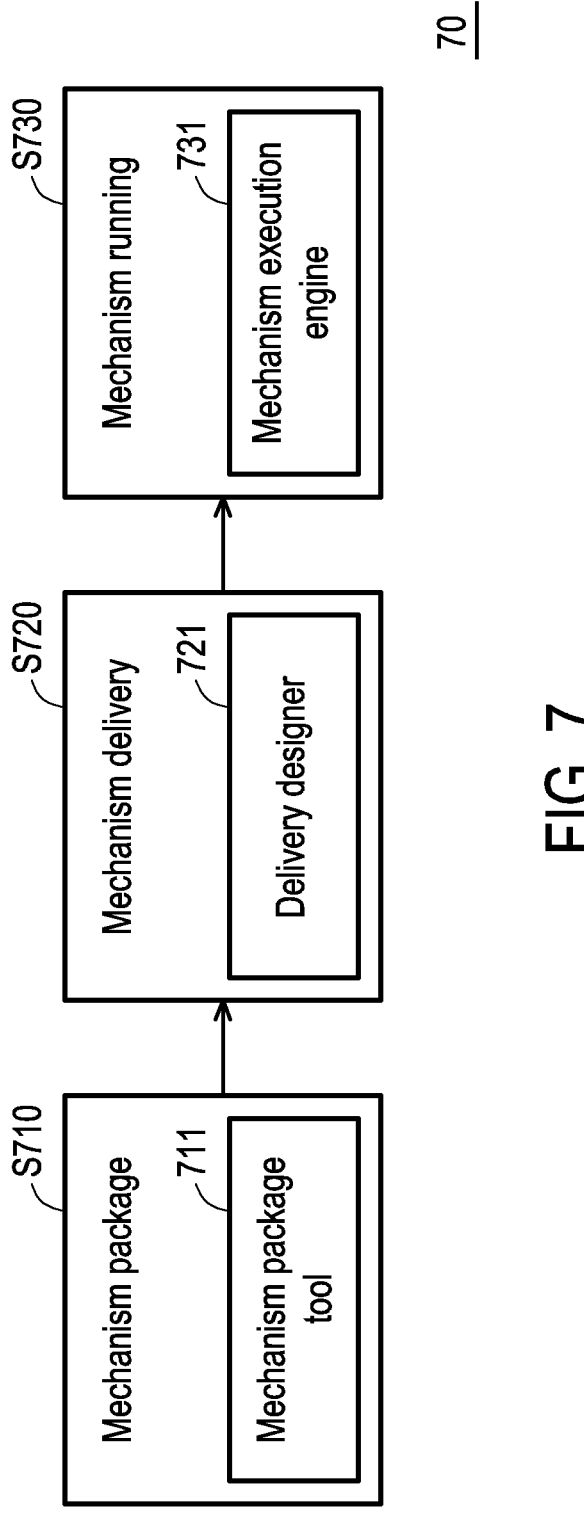
FIG. 7 is a schematic diagram of an operation of a knowledge management system according to another embodiment of the disclosure.

FIG. 7 is a schematic diagram of an operation of a knowledge management system according to another embodiment of the disclosure. Referring to FIG. 7, a knowledge management system 70 may execute multiple modules S710 to S730 to illustrate an application operation of the knowledge management system 70.

In the module S710, the knowledge management system 70 executes the package operation on an overall mechanism of the enterprise system through a mechanism package tool 711 (e.g., the execution model 413 in the embodiment of FIG. 4) in the server. In the module S720, the knowledge management system 70 delivers the packaged mechanism to the enterprise system through a delivery designer 721 in the server. In the module S730, the knowledge management system 70 cooperates with the enterprise system through a mechanism execution engine 731 in the server to run the overall mechanism of the enterprise system.

Based on the above, the knowledge management system and knowledge management method in the disclosure may implement the inheritance of knowledge and experience through the knowledge graph model by automatically constructing the knowledge graph data (such as the activity data nodes). On the other hand, the knowledge management system may respond to the variable factors by automatically generating the solution task to improve the working efficiency.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. A knowledge management system, comprising:
an electronic device configured to execute an interface module to obtain target input data and application input data; and
a server coupled to the electronic device, comprising:
a data model configured to generate a plurality of activity data nodes according to the target input data and source data;
an inspection item model configured to calculate the activity data nodes according to standard data to generate at least one inspection result;
an execution model configured to execute a package operation according to the at least one inspection result to generate a solution task, comprising:
breaking a link between a plurality of tasks; and
retrieving different data nodes respectively in the tasks to establish the solution task; and a control and decision model configured to calculate the application input data based on the solution task to generate a feedback result to the electronic device.

2. The knowledge management system according to claim 1, wherein the server further comprises:

a target model configured to control a mount point of an activity target, wherein the activity target comprises at least one of the target input data and the application input data.

3. The knowledge management system according to claim 1, wherein the data model is configured to configure a plurality of parameters of the target input data and the source data respectively to create a plurality of preliminary activity data nodes, and calculate the preliminary activity data nodes based on a built-in script to generate the activity data nodes.

4. The knowledge management system according to claim 1, wherein the standard data comprises a plurality of multi-strategy options, wherein the inspection item model is configured to calculate the activity data nodes with reference to the multi-strategy options to create a plurality of linking data nodes, and calculate the linking data nodes to generate the at least one inspection result corresponding to the multi-strategy options.

5. The knowledge management system according to claim 1, wherein the execution model is configured to create a plurality of operation execution nodes according to target expectation data when the at least one inspection result is abnormal, and package the operation execution nodes into the solution task.

6. The knowledge management system according to claim 1, wherein the solution task comprises first data, task data, and second data, and the task data is associated with the first data and the second data.

7. The knowledge management system according to claim 6, wherein the execution model is configured to retrieve the first data and the second data respectively in the tasks.

8. A knowledge management method, comprising:

through an electronic device, executing an interface module to obtain target input data and application input data;

through a data model of a server, generating a plurality of activity data nodes according to the target input data and source data;

through an inspection item model of the server, calculating the activity data nodes according to standard data to generate at least one inspection result;

through an execution model of the server, executing a package operation according to the at least one inspection result to generate a solution task, comprising:

breaking a link between a plurality of tasks; and retrieving different data nodes respectively in the tasks to establish the solution task; and through a control and decision model of the server, calculating the application input data based on the solution task to generate a feedback result to the electronic device.

9. The knowledge management method according to claim 8, wherein the method further comprises:

through a target model of the server, controlling a mount point of an activity target, wherein the activity target comprises at least one of the target input data and the application input data.

10. The knowledge management method according to claim 8, wherein generating the activity data nodes according to the target input data and the source data comprises:

through the data model, configuring a plurality of parameters of the target input data and the source data respectively to create a plurality of preliminary activity data nodes; and through the data model, calculating the preliminary activity data nodes based on a built-in script to generate the activity data nodes.

11. The knowledge management method according to claim 8, wherein the standard data comprises a plurality of multi-strategy options, wherein calculating the activity data nodes according to standard data to generate the at least one inspection result comprises:

through the inspection item model, calculating the activity data nodes with reference to the multi-strategy options to create a plurality of linking data nodes, and through the inspection item model, calculating the linking data nodes to generate the at least one inspection result corresponding to the multi-strategy options.

12. The knowledge management method according to claim 8, wherein executing the package operation according to the at least one inspection result to generate the solution task comprises:

through the execution model, creating a plurality of operation execution nodes according to target expectation data when the at least one inspection result is abnormal, and packaging the operation execution nodes into the solution task.

13. The knowledge management method according to claim 8, wherein the solution task comprises first data, task data, and second data, and the task data is associated with the first data and the second data.

14. The knowledge management method according to claim 13, wherein the method further comprises:

through the execution model, retrieving the first data and the second data respectively in the tasks.

* * * * *